(12) United States Patent
Hiller et al.

(10) Patent No.: US 9,142,237 B1
(45) Date of Patent: Sep. 22, 2015

(54) SLIDER OF A DISK DRIVE HAVING DATA FAVORABLE LOAD/UNLOAD ATTITUDE

(75) Inventors: Bernhard Hiller, San Jose, CA (US); David M. Sigmond, Superior, CO (US)

(73) Assignee: MAXTOR CORPORATION, Cupertino, CA (US)

( * ) Notice: Subject to any disclaimer, the term of this patent is extended or adjusted under 35 U.S.C. 154(b) by 2413 days.

(21) Appl. No.: 11/441,645

(22) Filed: May 26, 2006

Related U.S. Application Data

(60) Provisional application No. 60/688,012, filed on Jun. 7, 2005.

(51) Int. Cl.
   *G11B 21/02* (2006.01)
   *G11B 5/60* (2006.01)
(52) U.S. Cl.
   CPC ............ *G11B 5/6058* (2013.01); *G11B 5/6029* (2013.01)
(58) Field of Classification Search
   USPC .......... 360/75, 69, 294.7, 245.7, 294.3, 235.4
   See application file for complete search history.

(56) References Cited

U.S. PATENT DOCUMENTS

| | | | |
|---|---|---|---|
| 5,612,839 A | 3/1997 | Jacques | |
| 5,739,982 A | 4/1998 | Arya et al. | |
| 5,760,986 A | 6/1998 | Morehouse et al. | |
| 5,768,055 A | 6/1998 | Tian et al. | |
| 5,835,303 A | 11/1998 | Morehouse et al. | |
| 5,841,608 A | 11/1998 | Kasamatsu et al. | |
| 5,841,610 A | 11/1998 | Battu et al. | |
| 5,929,326 A * | 7/1999 | Imaino et al. | 73/105 |
| 5,995,330 A | 11/1999 | Furay et al. | |
| 6,535,355 B2 * | 3/2003 | Boutaghou et al. | 360/245.7 |
| 6,597,539 B1 | 7/2003 | Stupp et al. | |
| 6,757,124 B2 * | 6/2004 | Kelemen | 360/75 |
| 6,765,765 B2 | 7/2004 | Bement et al. | |
| 6,920,019 B2 | 7/2005 | Martin et al. | |
| 6,952,330 B1 * | 10/2005 | Riddering et al. | 360/294.7 |
| 7,156,139 B2 * | 1/2007 | Yao | 156/351 |
| 7,160,403 B2 * | 1/2007 | Yao | 156/64 |
| 2003/0081352 A1 * | 5/2003 | Rao et al. | 360/235.4 |

* cited by examiner

*Primary Examiner* — Fred Tzeng
(74) *Attorney, Agent, or Firm* — Mike Boeve

(57) ABSTRACT

A disk drive includes a drive housing, a storage disk, a head suspension assembly, an actuator assembly and a controller. The storage disk has a disk surface including a data region that stores data. In one embodiment, the head suspension assembly includes a slider and an attitude adjuster. The slider has an inner side edge, an outer side edge and a data transducer. The attitude adjuster can adjust a roll attitude and/or a pitch attitude of the slider relative to the disk surface. The slider moves between a first position wherein the data transducer is not positioned directly over the data region and a second position wherein the data transducer is positioned directly over the data region during one of a load operation and an unload operation. The controller controls an electrical signal to the attitude adjuster during one of the load operation and the unload operation to dynamically adjust the attitude of the slider. The attitude adjuster can include one or more piezoelectric elements that expand and/or contract to adjust the orientation of the slider relative to the storage disk.

41 Claims, 7 Drawing Sheets

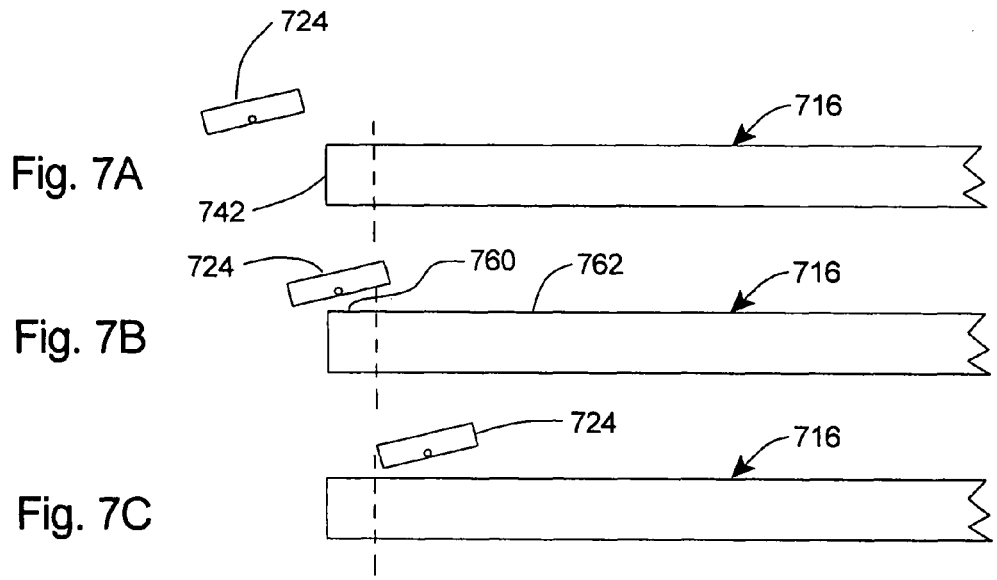
Fig. 7A
Fig. 7B
Fig. 7C
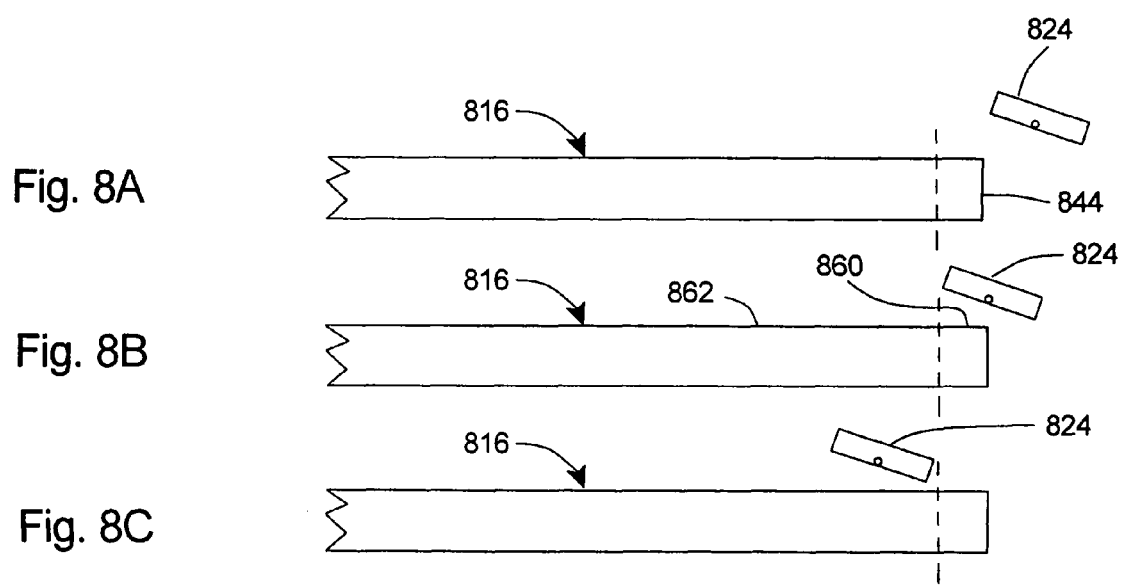
Fig. 8A
Fig. 8B
Fig. 8C

US 9,142,237 B1

SLIDER OF A DISK DRIVE HAVING DATA FAVORABLE LOAD/UNLOAD ATTITUDE

RELATED APPLICATION

This Application claims the benefit on U.S. Provisional Application Ser. No. 60/688,012 filed on Jun. 7, 2005. The contents of U.S. Provisional Application Ser. No. 60/688,012 are incorporated herein by reference.

BACKGROUND

Disk drives are widely used in computers, consumer electronics and data processing systems for storing information in digital form. The disk drive typically includes one or more storage disks and one or more head suspension assemblies. Each head suspension assembly includes a suspension and a slider assembly that transfers information to and from the storage disk. In many disk drives, in order to decrease the likelihood of unwanted contact between the slider assembly and the storage disk, the slider assembly is positioned off the storage disk when the drive is not powered up or when data transmission is not occurring. For example, the slider assembly can be moved onto a ramp positioned inward from an inner diameter or beyond an outer diameter of the storage disk, also referred to as "ramp load technology". Once the disk drive receives a command necessitating the transmission of data, an actuator repositions the slider assembly directly over a data storage area of the storage disk.

Because today's disk drives demand a greater and greater amount of data storage, utilizing as much of the disk surface of the storage disk for storing data has become of great importance. However, this desire to use more of the disk surface for data storage must be balanced with concerns of data loss and damage to the storage disk during repositioning of the slider assembly from the ramp to directly over the storage disk. Data loss can occur by damaging the storage disk with edges or corners of the slider during this type of repositioning of the slider, which can result in scratches or dings. Other types of disk contact can result in frictional heating, causing erasure of data, known as soft errors.

As a consequence, in conventional disk drives, an annular section of the disk surface near the inner and/or outer diameter is devoid of data tracks used for storing data. For example, in small form factor drives, as much as ten percent or more of the storage disk can be set aside for this purpose. Thus, despite the desire to increase data storage, a significant surface area of the disk surface is intentionally left vacant based on the higher degree of risk that any data in this area will potentially be lost.

SUMMARY

One embodiment of a disk drive includes a drive housing, a storage disk, a head suspension assembly, an actuator assembly and a controller. The storage disk has a disk surface including a data region that stores data. In this embodiment, the head suspension assembly includes a slider and an attitude adjuster. The slider has an inner side edge, an outer side edge and a data transducer. The data transducer magnetically interacts with the storage disk. In this embodiment, the attitude adjuster adjusts a roll attitude and/or a pitch attitude of the slider relative to the disk surface. The slider moves between a first position wherein the data transducer is not positioned directly over the data region and a second position wherein the data transducer is positioned directly over the data region during one of a load operation and an unload operation. The controller controls an electrical signal to the attitude adjuster during one of the load operation and the unload operation to dynamically adjust the attitude of the slider.

In certain embodiments, the attitude adjuster includes one or more piezoelectric elements that expand and/or contract to dynamically adjust the orientation of the slider relative to the storage disk during the load and/or unload operations.

One method for moving a slider relative to a storage disk of a disk drive includes the step of dynamically controlling a roll attitude of the slider with an electrically energized attitude adjuster as a position of the slider changes between the first position and the second position.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 7A is a simplified elevational view of still another embodiment of a slider assembly shown in a first position near the outer diameter of the storage disk;

FIG. 7B is a simplified elevational view of the slider assembly shown in a second position near the outer diameter of the storage disk;

FIG. 7C is a simplified elevational view of the slider assembly shown in a third position near the outer diameter of the storage disk;

FIG. 8A is a simplified elevational view of still another embodiment of a slider assembly shown in a first position near the inner diameter of the storage disk;

FIG. 8B is a simplified elevational view of the slider assembly shown in a second position near the inner diameter of the storage disk; and FIG. 8C is a simplified elevational view of the slider assembly shown in a third position near the inner diameter of the storage disk.

DESCRIPTION

Figure 1:
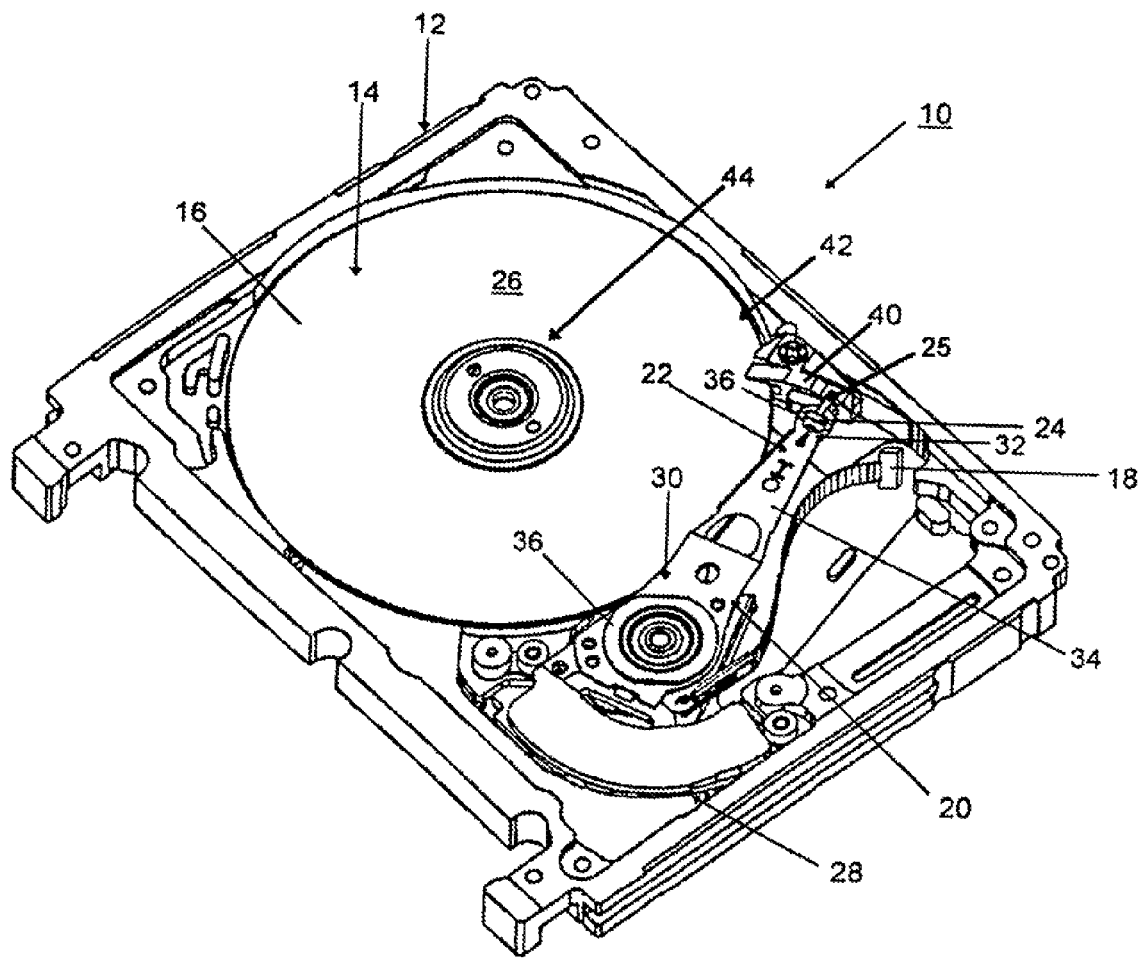
FIG. 1 is a perspective view of a disk drive having features of one embodiment of the present invention.

FIG. 1 illustrates a perspective view of a disk drive 10 that includes (i) a drive housing 12, (ii) a disk assembly 14 having one or more storage disks 16, (iii) a controller 18, and (iv) a head stack assembly 20 including an actuator assembly 21 and one or more head suspension assemblies 22, with each head suspension assembly 22 including a slider 24 and an attitude adjuster 25.

Each storage disk 16 includes one or more disk surfaces 26 that each has a plurality of concentric data tracks (not shown) that store data, including a target track. Further, the storage disk 16 can also include non-data tracks, such as servo tracks. Once the slider 24 stabilizes over the target track, data is read from the storage disk 16 during a read operation and transferred to the storage disk 16 during a write operation. The controller 18 sends electrical signals to and/or receives electrical signals from the slider 24 during read and/or write operations.

The head stack assembly 20 illustrated in FIG. 1 includes an actuator motor 28, one head suspension assembly 22, and one actuator arm 30. The head suspension assembly 22 is secured to the actuator arm 30, and supports the slider 24 near one of the disk surfaces 26 of the storage disk 16 during operation of the disk drive 10. The actuator motor 28 moves the actuator arm 30 and the head suspension assembly 22 relative to the storage disk 16. The head stack assembly 20 can alternatively include a plurality of actuator arms 30 that each supports up to two head suspension assemblies 22.

Each head suspension assembly 22 includes the slider 24 and a suspension 32 that supports the slider 24. The suspension 32 includes a load beam 34 and a flexure 36. The load beam 34 attaches the flexure 36 and the slider 24 to the actuator arm 30. Each load beam 34 can be flexible in a direction perpendicular to the storage disk 16 and can act as a spring for supporting the slider 24. Typically, the load beam 34 is formed from a metallic material such as stainless steel or other suitable materials. In an alternative embodiment, the load beam 34 and the flexure 36 can be formed as an integral, unitary structure that can utilize homogeneous or non-homogeneous materials.

Each flexure 36 attaches the slider 24 to the load beam 34. The slider 24 can be secured to the flexure 36 with an epoxy material or in other suitable ways known to those skilled in the art. The flexure 36 can be formed from various metallic materials such as stainless steel or other suitable materials.

The slider 24 transfers information between the controller 18 and the storage disk 16. The design of the slider 24 can vary depending upon the requirements of the head suspension assembly 22 and/or the disk drive 10. The composition of the slider 24 can vary. In one embodiment, portions of the slider 24 can be formed from materials such as alumina titanium carbide ceramic, for example.

Additionally, the head suspension assembly 22 can include a lifting feature 38 that engages a ramp 40 that is positioned near the disk assembly 14. The ramp 40 can be positioned near an outer diameter 42 of the storage disk 16 as illustrated in FIG. 1 or near an inner diameter 44 of the storage disk 16.

The attitude adjuster 25 dynamically adjusts a roll static attitude and/or a pitch static attitude of the slider 24 relative to the storage disk 16 at various times during operation of the disk drive 10. As used herein, the roll static attitude is defined as the extent of a side-to-side tipping of the slider 24 relative to the storage disk 16. The pitch static attitude is defined as the extent of a front to rear tipping of the slider 24 relative to the storage disk 16. Both the roll static attitude and the pitch static attitude can be measured as an angle (in degrees) relative to a suitable reference plane such as the disk surface 26 of the adjacent storage disk 16, for example.

As provided herein, the controller 18 can control electrical signals that are sent to the attitude adjuster 25 in order to adjust the roll static attitude and/or the pitch static attitude of the slider 24. In certain embodiments described herein, this adjustment occurs during movement of the slider 24 from the ramp 40 to over the storage disk 16 for the transfer of data (sometimes referred to herein as "loading") and/or during movement of the slider 24 from over the storage disk 16 to the ramp 40 (sometimes referred to herein as "unloading"), for instance. As explained in greater detail below, because of the orientation of the slider 24 is controlled by the attitude adjuster 25 during loading and/or unloading, the usable data storage area (e.g., data region 260 illustrated in FIGS. 2C-2E) on each storage disk 16 can be increased. In addition, or in the alternative, the risk of damage to data and/or loss of data can be reduced.

Figure 2A:
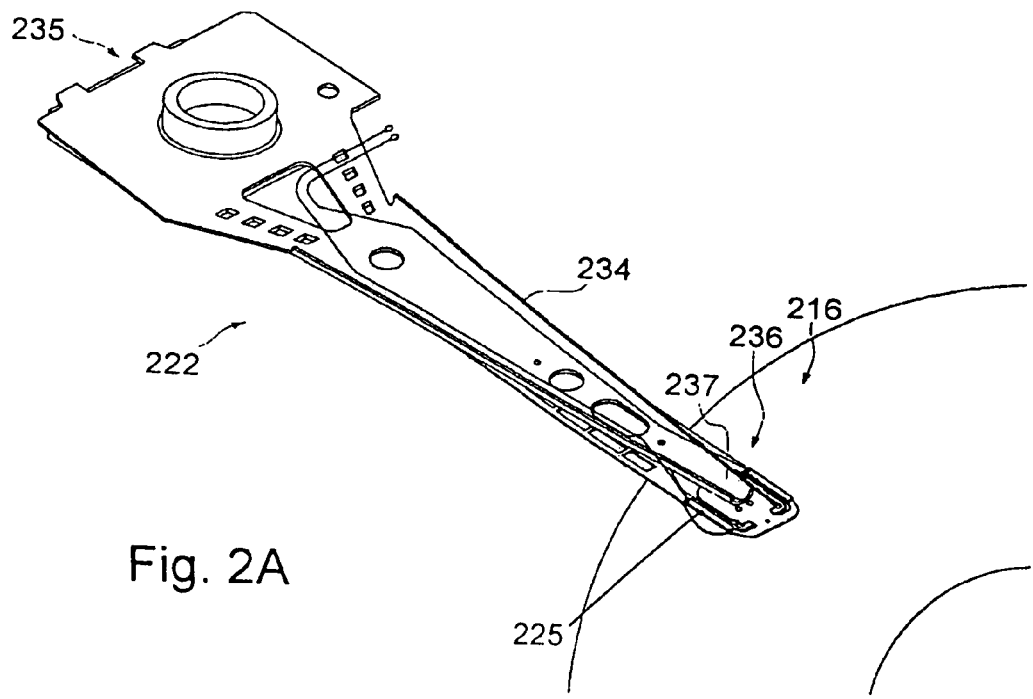
FIG. 2A is a perspective view of a portion of a storage disk and one embodiment of a head suspension assembly.

FIG. 2A is a perspective view of one embodiment of a head suspension assembly 222 and a portion of an adjacent storage disk 216. In this embodiment, the head suspension assembly 222 includes the loadbeam 234, the flexure 236, the slider 224 (illustrated in FIG. 2B) and the attitude adjuster 225. The load beam 234 has a first end 235 that is coupled to the actuator arm 30 (illustrated in FIG. 1) and a second end 237 that supports the flexure 236. The flexure 236 supports the slider 224 over the rotating storage disk 216. In this embodiment, the attitude adjuster 225 is secured to the flexure 236. As provided in greater detail below, the attitude adjuster 225 deforms various portions of the flexure 236 to generate the desired roll static attitude and/or pitch static attitude of the slider 224.

Figure 2B:
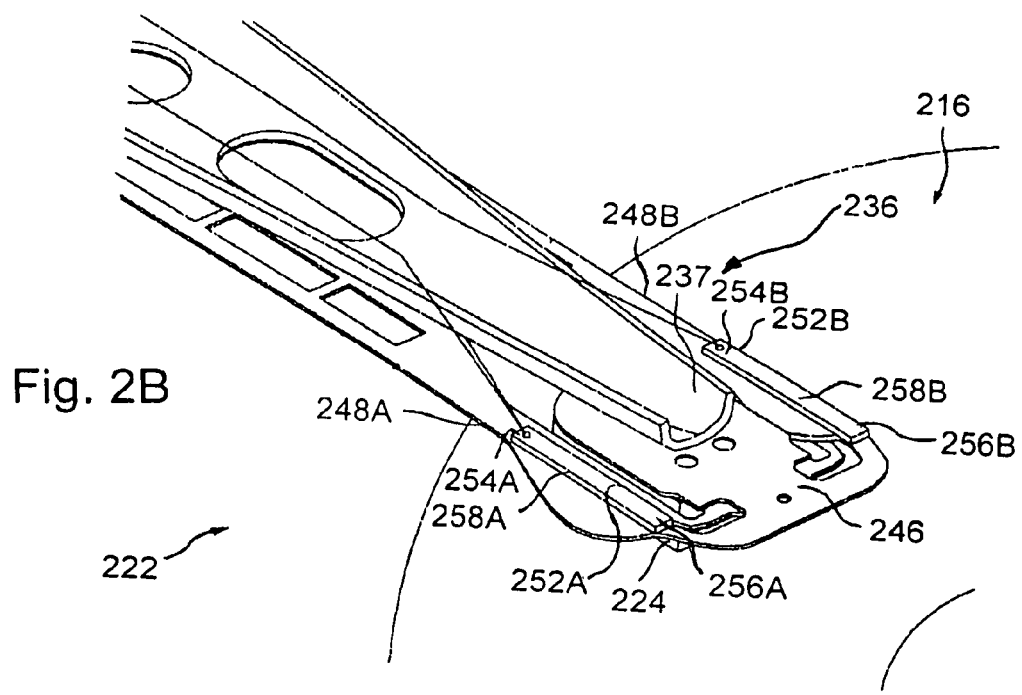
FIG. 2B is a detailed view of a portion of the head suspension assembly illustrated in FIG. 2A.

FIG. 2B is an enlarged view of a portion of the head suspension assembly 222 illustrated in FIG. 2A. The flexure 236 includes a flexure tongue 246 and a pair of flexure legs 248A, 248B extending from the flexure tongue 246. In one embodiment, the attitude adjuster 225 includes one or more actuators, such as expansion elements, for example, that cooperate with one another to cause a change in the roll static attitude or the pitch static attitude of the slider 224. In the embodiment illustrated in FIG. 2B, the attitude adjuster 225 includes two expansion elements 252A, 252B that are each separately attached to a corresponding flexure leg 248A, 248B. Each expansion element 252A, 252B, respectively, has a first end 254A, 254B, a second end 256A, 256B, and an intermediate portion 258A, 258B. In the embodiment illustrated in FIG. 2B, the intermediate portion 258A, 258B can selectively float free above the corresponding flexure leg 248A, 248B. The configuration of the expansion elements 252A, 252B provided in FIG. 2B is also set forth in U.S. Pat. No. 6,597,539, issued to Stupp, et al., and assigned to Maxtor Corporation, assignee of the present invention. To the extent permitted, U.S. Pat. No. 6,597,539 is incorporated herein by reference.

Each expansion element 252A, 252B can be coupled to the controller 18 (illustrated in FIG. 1), which can separately control expansion and contraction of the expansion elements 252A, 252B. In this embodiment, expansion of the expansion elements 252A, 252B, causes the flexure leg 248A, 248B to move closer to the corresponding intermediate portion 258A, 258B of the respective expansion element 252A, 252B, e.g., to cause a relative straightening of the otherwise arc-shaped flexure leg 248A, 248B. To the extent that one flexure leg 248A straightens to a greater extent than the other flexure leg 248B, the roll static attitude of the slider 224 changes, as provided in greater detail below.

The expansion elements 252A, 252B can be formed in a number of geometries and can be formed from a number of materials such piezoelectric elements, which can be formed from any suitable material exhibiting piezoelectric properties. In non-exclusive alternative embodiments, for example, these piezoelectric elements can be formed from PZT material, quartz analogue crystals like berlinite (AlPO$_4$) and gallium orthophosphate (GaPO$_4$), ceramics with perovskite, or tungsten-bronze structures such as BaTiO$_3$, SrTiO$_3$, Pb(ZrTi)O$_3$, KNbO$_3$, LiNbO$_3$, LiTaO$_3$, BiFeO$_3$, Na$_x$WO$_3$, Ba$_2$NaNb$_5$O$_5$, or Pb$_2$KNb$_5$O$_{15}$. In alternative embodiments, the expansion elements 252A, 252B are formed from expansive materials such as iron-nickel, iron-nickel-cobalt, or iron-nickel-chrome, as non-exclusive examples. The percentages of the constituents forming the expansion elements 252A, 252B can be dependent upon the magnitude of the desired expansion of the expansion elements 252A, 252B.

In one non-exclusive example, the expansion elements 252A, 252B can have the following approximate dimensions: 1.5 millimeters in length; 100 to 200 micrometers in width; and 25-50 micrometers in height, although these dimensions can be varied depending upon the design requirements of the disk drive 10. It is recognized that the expansion elements 252A, 252B need not conform to the foregoing dimensions to be functional and/or effective.

Figure 2C:
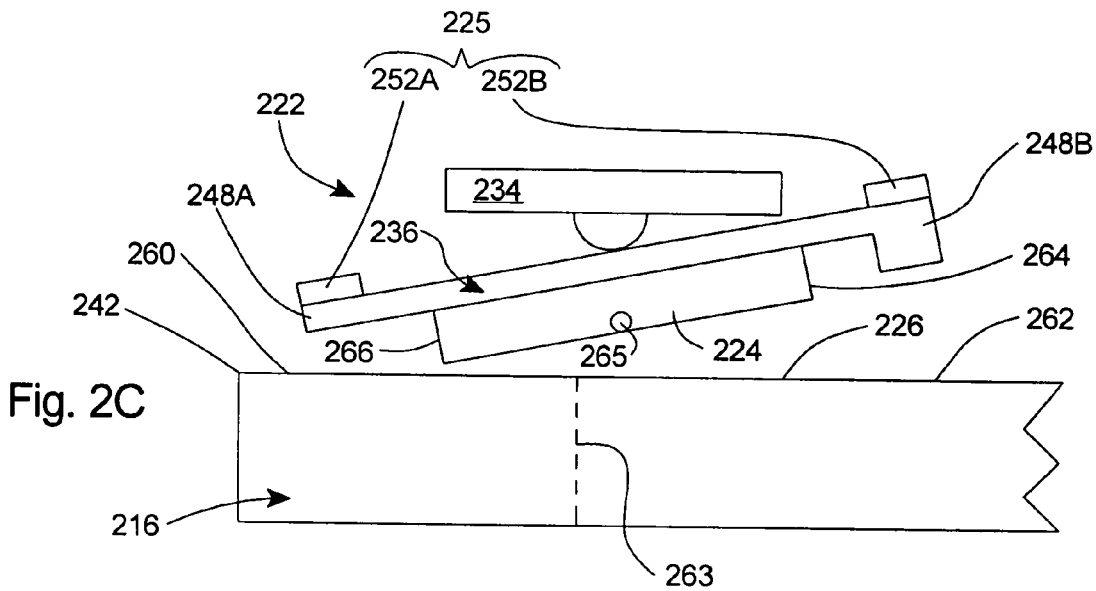
FIG. 2C is a simplified end view of a portion of the head suspension assembly shown in a first position, and a portion of the storage disk.
Figure 2D:
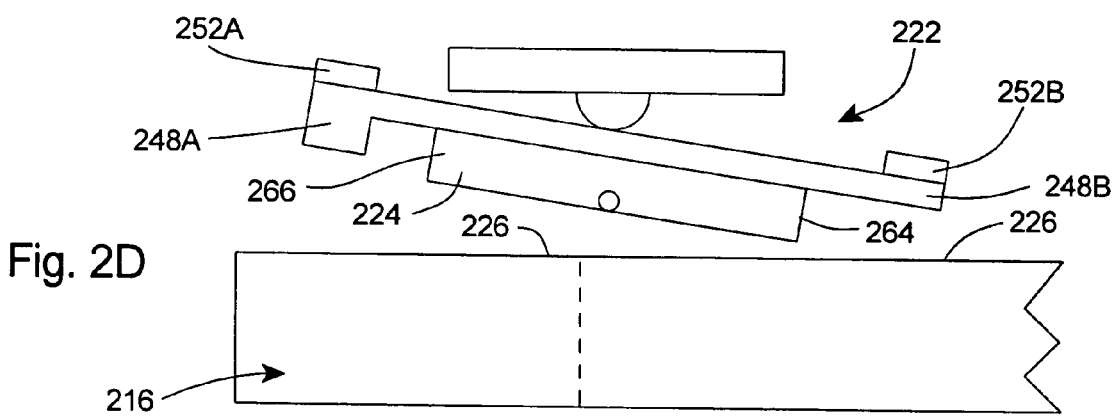
FIG. 2D is a simplified end view of a portion of the head suspension assembly shown in a second position, and a portion of the storage disk.
Figure 2E:
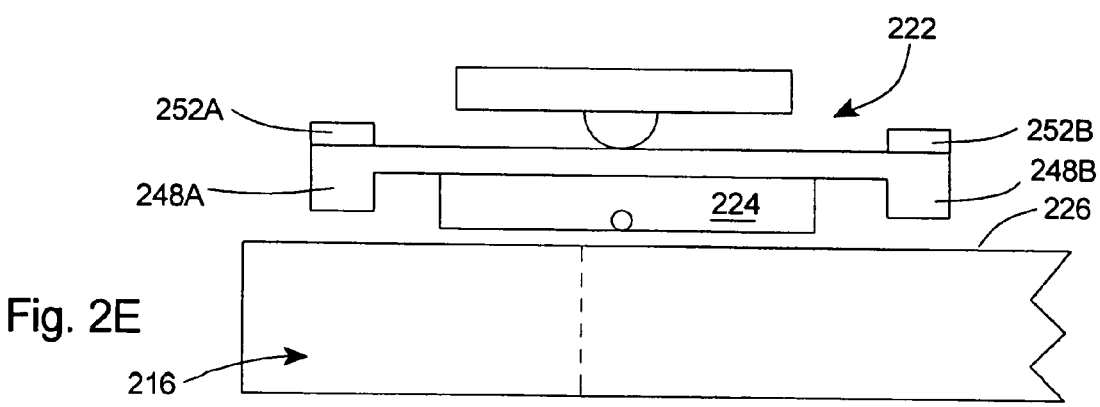
FIG. 2E is a simplified end view of a portion of the head suspension assembly shown in a third position, and a portion of the storage disk.

FIGS. 2C-2E illustrate three simplified elevational representations of one embodiment of a portion of the head suspension assembly 222 such as that illustrated in FIG. 2B, and a portion of a storage disk 216 having a disk surface 226. FIGS. 2C-2E show the slider 224 at three different roll static attitudes relative to the storage disk 216. It is important to note that both the orientations of the slider 224 relative to the storage disk 216 and the relative sizes of the components of the head suspension assembly 222 and the storage disk 216 shown throughout the views in FIGS. 2C-2E and subsequent figures are not to scale and have been substantially exaggerated for illustrative purposes and for ease of understanding.

In the embodiment illustrated in FIG. 2C, the head suspension assembly 222 includes a load beam 234, a flexure 236, a slider 224 and an attitude adjuster 225. The disk surface 226 includes a non-data region 260 at and/or near the outer diameter 242 and a data region 262 (the separation of which is demarcated by dashed line 263). The non-data region 260 is not adapted to store data, while the data region 262 is adapted to store data. In this embodiment, the slider 224 includes a data transducer 265, and has an inner side edge 264 and an outer side edge 266. The data transducer 265 magnetically interacts with the storage disk 216 to transfer data. As used herein, the inner side edge 264 is the first side edge of the slider 224 to move over the data region 262 of the storage disk 216 during loading of the slider 224 from near the outer diameter 242. The outer side edge 266 is opposite the inner side edge 264 and therefore moves over the data region 262 subsequent to the inner side edge 264 during loading from near the outer diameter 242. In other words, when the slider 224 is positioned over the data region 262 of the storage disk 216, the inner side edge 264 is nearest the inner diameter 44 (illustrated in FIG. 1), and the outer side edge 266 is nearest the outer diameter 242.

FIG. 2C illustrates that the attitude adjuster 225 described in FIGS. 2A and 2B can be used to generate a positive roll static attitude of the slider 224 relative to the storage disk 216. As used herein, a positive roll of the slider 224 means that the inner side edge 264 is further away from the disk surface 226 than the outer side edge 266. In other words, the slider 224 is tipped so that the slider 224 is angled from side-to-side in a direction from the inner side edge 264 to the outer side edge 266. In this embodiment, to achieve a positive roll static attitude, the expansion elements 252A, 252B are selectively energized and thus selectively elongated to unevenly deform the flexure legs 248A, 248B. For example, elongating expansion element 252A more than expansion element 252B will cause a deformation (e.g., tend to straighten) of flexure leg 248A more than flexure leg 248B to thereby induce a positive roll in the slider 224, as illustrated in FIG. 2C. The particular roll angle of the slider 224 to be used during loading or unloading of the slider 224 can vary based on the design requirements of the disk drive 10.

Conversely, as illustrated in FIG. 2D, a negative roll in the slider 224 has been induced because expansion element 252B has been elongated more than expansion element 252A. As a result, flexure leg 248B has become deformed (e.g., straightened) more than flexure leg 248A, thereby causing the negative roll. As used herein, a negative roll attitude means that the inner side edge 264 is closer to the disk surface 226 of the storage disk 216 than the outer side edge 266. Stated another way, the slider 224 is tipped in an opposite direction from that shown in FIG. 2C, so that the outer side edge 266 is raised above the level of the inner side edge 264 in relation to the disk surface 226.

The attitude adjuster 225 can also be used to selectively provide a zero roll in the slider 224 relative to the storage disk 216 as illustrated in FIG. 2E. For example, the controller 18 (illustrated in FIG. 1) can substantially equally energize (or de-energize) the expansion elements 252A, 252B so that the flexure legs 248A, 248B are equally deformed (or non-deformed, as appropriate). In this manner, substantially no roll is imparted on the slider 224.

Further, although not specifically illustrated in the Figures, it is recognized that by increasing or decreasing the energization of the expansion elements 252A, 252B in substantially equal amounts with the controller 18, the flexure legs 248A, 248B can be deformed substantially equally, resulting in a change in the pitch static attitude of the slider 224 relative to the storage disk 216. Consequently, in certain embodiments, the attitude adjuster 225 can equally be used to dynamically adjust the pitch static attitude either separate from, or in conjunction with, the roll static attitude, during loading and/or unloading of the slider 224 relative to the storage disk 216. The particular pitch angle of the slider 224 to be used during loading or unloading of the slider 224 can vary based on the design requirements of the disk drive 10 and on the roll angle of the slider 224.

Figure 3A:
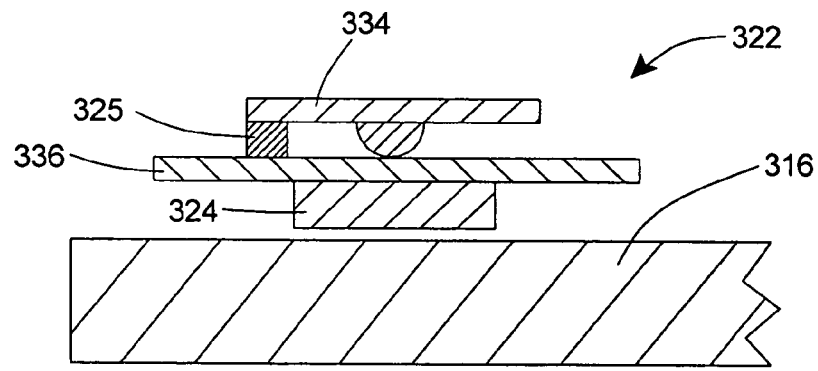
FIG. 3A is a simplified cross-sectional view of a portion of the storage disk and another embodiment of a portion of a head suspension assembly shown in a first position.
Figure 3B:
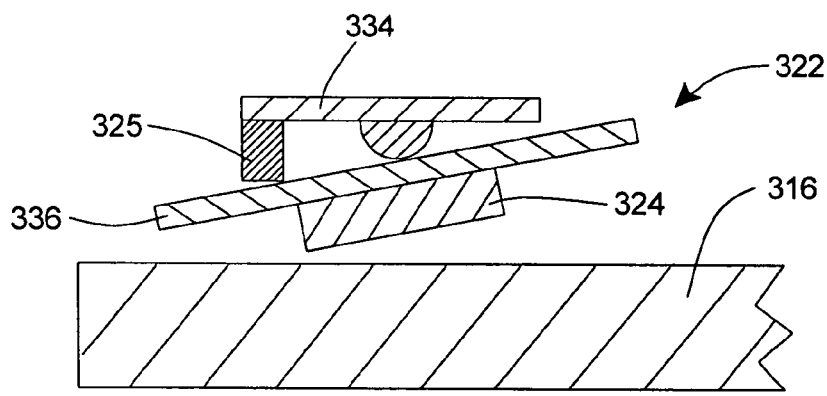
FIG. 3B is a simplified cross-sectional view of the portion of the storage disk and the portion of a head suspension assembly illustrated in FIG. 3A, shown in a second position.
Figure 3C:
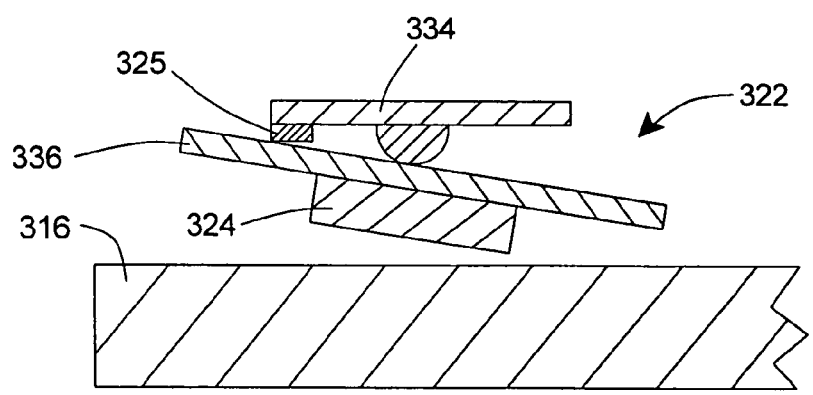
FIG. 3C is a simplified cross-sectional view of the portion of the storage disk and the portion of a head suspension assembly illustrated in FIG. 3A, shown in a third position.

FIGS. 3A-3C illustrate simplified cross-sectional views of a portion of another embodiment of the head suspension assembly 322 and a portion of a storage disk 316. In this embodiment, the head suspension assembly 322 includes a load beam 334, a flexure 336, a slider 324 and an attitude adjuster 325. It is recognized that the positioning and relative size of the components illustrated in FIGS. 3A-3C are exaggerated for illustrative purposes and ease of understanding. The specific orientation and positioning of each of these components can be varied. In the embodiment illustrated in FIGS. 3A-3C, however, the attitude adjuster 325 is positioned between the load beam 334 and the flexure 336. In alternative embodiments, the attitude adjuster 325 can be secured to either or both of the load beam 334 and/or the flexure 336.

In the embodiment illustrated in FIGS. 3A-3C, the attitude adjuster 325 can be formed from an expansive material. For example, in one embodiment, the attitude adjuster 325 can include a piezoelectric element as described above or another suitably expandable material such as a thermally expansive material. Upon energizing the attitude adjuster 325 via the controller 18 (illustrated in FIG. 1), a portion or all of the attitude adjuster 325 can expand, thereby exerting a force on the flexure 336 to cause a change in orientation of the slider 324 relative to the storage disk 316. Conversely, upon de-energizing the attitude adjuster 325 using the controller 18, the attitude adjuster 325 can contract, thereby reducing a force on a portion of the flexure 336 to cause an opposite change in orientation of the slider 324 relative to the storage disk 316.

FIG. 3A illustrates the attitude adjuster 325 in a first position, during receipt of a first electrical signal from the controller 18. In the first position, the slider 324 has substantially a zero roll attitude relative to the storage disk 316. By increasing or decreasing this magnitude of the electrical signal from the controller 18, the roll attitude can be adjusted as needed.

FIG. 3B illustrates the attitude adjuster 325 in a second position, during receipt of an increased electrical signal from that received in the first position. Because the material used to form the attitude adjuster 325 is expansive, the attitude adjuster 325 expands to impart an increased force on a portion of the flexure 336, thereby resulting in movement of the flexure 336, and thus, a positive roll attitude of the slider 324 relative to the storage disk 316.

FIG. 3C illustrates the attitude adjuster 325 in a third position, during receipt of a decreased electrical signal from that received in the first position. In the third position, the attitude adjuster 325 contracts to decrease the force on the portion of the flexure 336, thereby resulting in a negative roll attitude of the slider 324 relative to the storage disk 316.

FIGS. 4A-4D illustrate adjustment the orientation of the slider 424 relative to the storage disk 416 during a specific drive operation that includes loading of the slider 424 near the outer diameter 442, as performed by the attitude adjuster 25 (illustrated in FIG. 1, for example). The type of drive operation can vary, but includes movement of the slider 424 between a parked position and a position directly over the data region 460 of the storage disk 416.

Figure 4A:
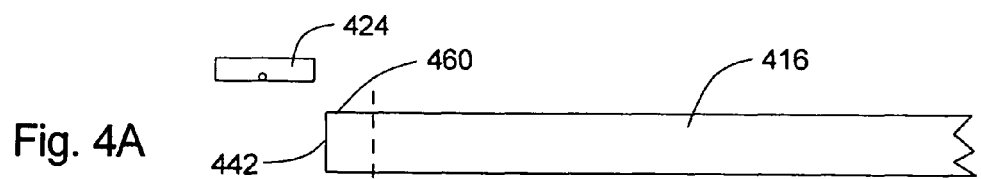
FIG. 4A is a simplified elevational view of a slider shown in a first position near an outer diameter of an adjacent storage disk.

FIG. 4A represents a slider 424 in a first position that is parked on a ramp 40 (illustrated in FIG. 1) or is otherwise not yet loaded over the storage disk 416. In this embodiment, in the first position, the attitude adjuster 25 adjusts the roll of the slider 424 so that the slider 424 has a zero roll. It is recognized, however, that the attitude adjuster 25 can adjust the orientation of the slider 424 to have any suitable roll attitude in the first position.

Figure 4B:
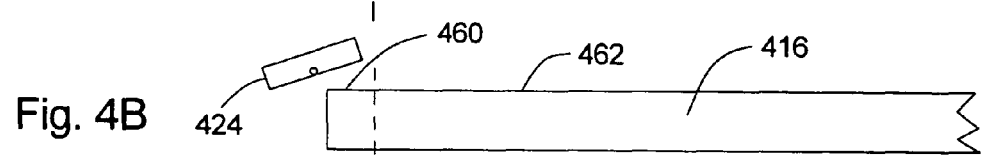
FIG. 4B is a simplified elevational view of the slider illustrated in FIG. 4A shown in a second position near the outer diameter of the adjacent storage disk.

FIG. 4B illustrates the slider 424 in a second position, moving toward the storage disk 416 during loading. As the slider approaches the storage disk 416, the controller 18 (illustrated in FIG. 1) sends an electrical signal to the attitude adjuster 25 to adjust the roll attitude of the slider 424 so that the slider 424 has a positive roll attitude. For example, in one embodiment, the controller 18 can adjust the electrical signal to the attitude adjuster 25 so that the slider 424 has a roll static attitude of between approximately zero and +2 degrees, although it may be advantageous to position the slider 424 at a positive roll attitude outside of this range. In the second position, the slider 424 is partially positioned directly over the storage disk 416, and is moving in a direction from the non-data region 460 toward the data region 462.

Figure 4C:
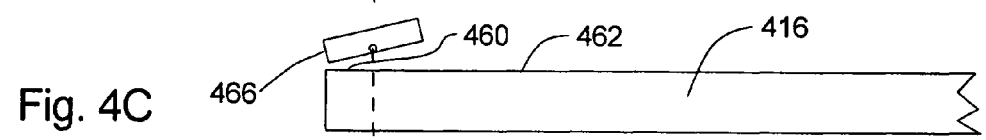
FIG. 4C is a simplified elevational view of the slider illustrated in FIG. 4A shown in a third position near the outer diameter of the adjacent storage disk.

FIG. 4C illustrates the slider 424 in a third position during loading. As the slider 424 moves toward being fully loaded over the data region 462, the controller 18 (illustrated in FIG. 1) sends an electrical signal to the attitude adjuster 25 to maintain a positive roll attitude of the slider 424. In the third position, in the event the slider 424 contacts the storage disk 416, the outer side edge 466 of the slider 424 will contact the non-data region 460. With this design, loss of data due to contact between the slider 424 and the storage disk 416 during loading is reduced because the portion of the slider 424 closest to the storage disk 416 is the last to move directly over the storage disk 416, and does so over the non-data region 460 of the storage disk 416.

Figure 4D:
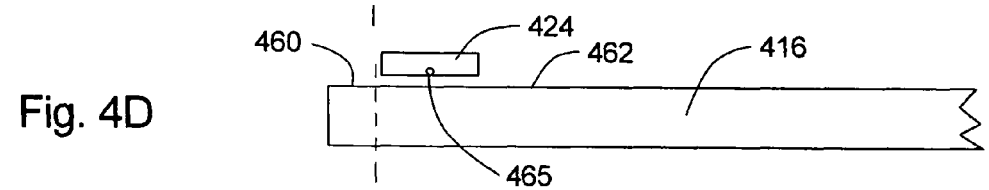
FIG. 4D is a simplified elevational view of the slider illustrated in FIG. 4A shown in a fourth position near the outer diameter of the adjacent storage disk.

FIG. 4D illustrates the slider 424 in a fourth position during or immediately following loading. Once the slider 424 has moved so that the data transducer 465 is positioned directly over the data region 462, the controller 18 adjusts the magnitude of the electrical signal to the attitude adjuster 25 to change the orientation of the slider 424 to approximately a zero roll attitude. A zero roll attitude is useful once the slider 424 is in the fourth position to allow a decreased spacing between the data transducer 465 and the data region 462 of the storage disk 416 for more precise data transfer.

In a somewhat similar but reverse manner, the slider 424 can be unloaded from over the storage disk 416 using the attitude adjuster 25, as provided in greater detail below.

FIGS. 5A-5D illustrate how the attitude adjuster 25 (illustrated in FIG. 1, for example) can be utilized to dynamically adjust the orientation of the slider 524 relative to the storage disk 516 during a specific drive operation that includes loading of the slider 524 near the inner diameter 544. The type of drive operation can vary, but includes movement of the slider 524 between a parked position and a position directly over the data region 560 of the storage disk 516.

Figure 5A:
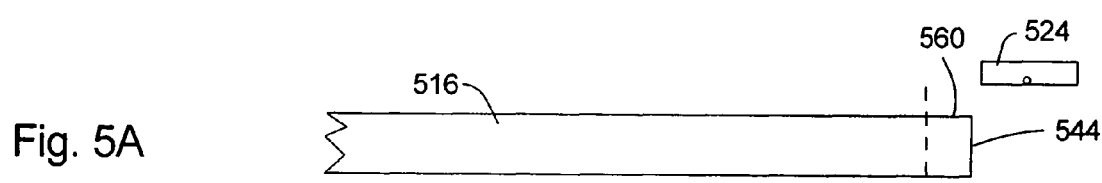
FIG. 5A is a simplified elevational view of a slider shown in a first position near an inner diameter of an adjacent storage disk.

FIG. 5A represents a slider 524 in a first position that is parked on a ramp 40 (illustrated in FIG. 1) that positioned near the inner diameter 544 or is otherwise not yet loaded over the storage disk 516. In this embodiment, in the first position, the attitude adjuster 25 adjusts the roll of the slider 524 so that the slider has a zero roll. It is recognized, however, that the attitude adjuster 25 can adjust the orientation of the slider 524 to have any suitable roll attitude in the first position.

Figure 5B:
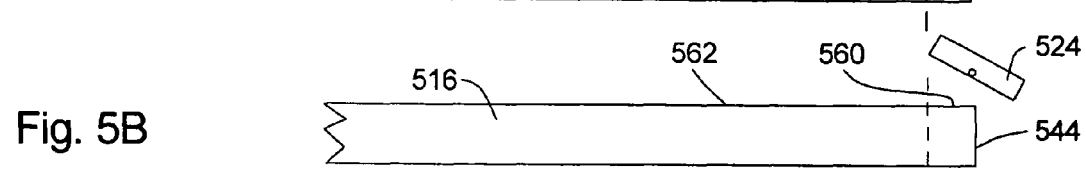
FIG. 5B is a simplified elevational view of the slider illustrated in FIG. 6A shown in a second position near the inner diameter of the adjacent storage disk.

FIG. 5B illustrates the slider 524 in a second position, moving toward the storage disk 516 during loading. As the slider approaches the storage disk 516, the controller 18 (illustrated in FIG. 1) sends an electrical signal to the attitude adjuster 25 to adjust the roll attitude of the slider 524 so that the slider 524 has a negative roll attitude. In the second position, the slider 524 is partially positioned directly over the storage disk 516, and is moving in a direction from a non-data region 560 near the inner diameter 544 toward the data region 562.

Figure 5C:
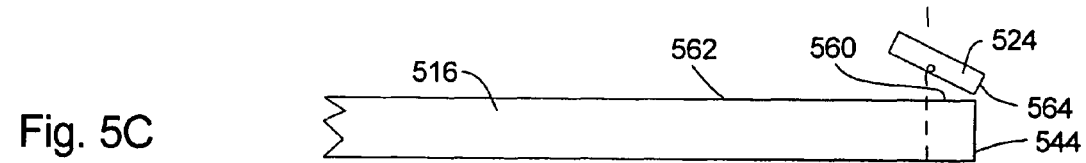
FIG. 5C is a simplified elevational view of the slider illustrated in FIG. 6A shown in a third position near the inner diameter of the adjacent storage disk.

FIG. 5C illustrates the slider 524 in a third position during loading. As the slider 524 moves toward being fully loaded over the data region 562, the controller 18 (illustrated in FIG. 1) sends an electrical signal to the attitude adjuster 25 to maintain a negative roll attitude of the slider 524. In the third position, in the event the slider 524 contacts the storage disk 516, the inner side edge 564 of the slider 524 will contact the non-data region 560. With this design, loss of data due to contact between the slider 524 and the storage disk 516 during loading is reduced because the portion of the slider 524 closest to the storage disk 516 is the last to move directly over the storage disk 516, and does so over the non-data region 560 of the storage disk 516.

Figure 5D:
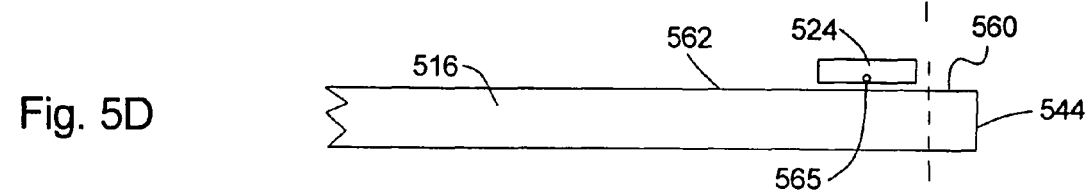
FIG. 5D is a simplified elevational view of the slider illustrated in FIG. 6A shown in a fourth position near the inner diameter of the adjacent storage disk.

FIG. 5D illustrates the slider 524 in a fourth position during or immediately following loading. Once the slider 524 has moved so that the data transducer 565 is positioned directly over the data region 562, the controller 18 adjusts the magnitude of the electrical signal to the attitude adjuster 25 to change the orientation of the slider 524 to approximately a zero roll attitude. A zero roll attitude is useful once the slider 524 is in the fourth position to allow a decreased spacing between the data transducer 565 and the data region 562 of the storage disk 516 for more precise data transfer.

In a somewhat similar but reverse manner, the slider 524 can be unloaded from over the storage disk 516 using the attitude adjuster 25, as provided in greater detail below.

Figure 6A:
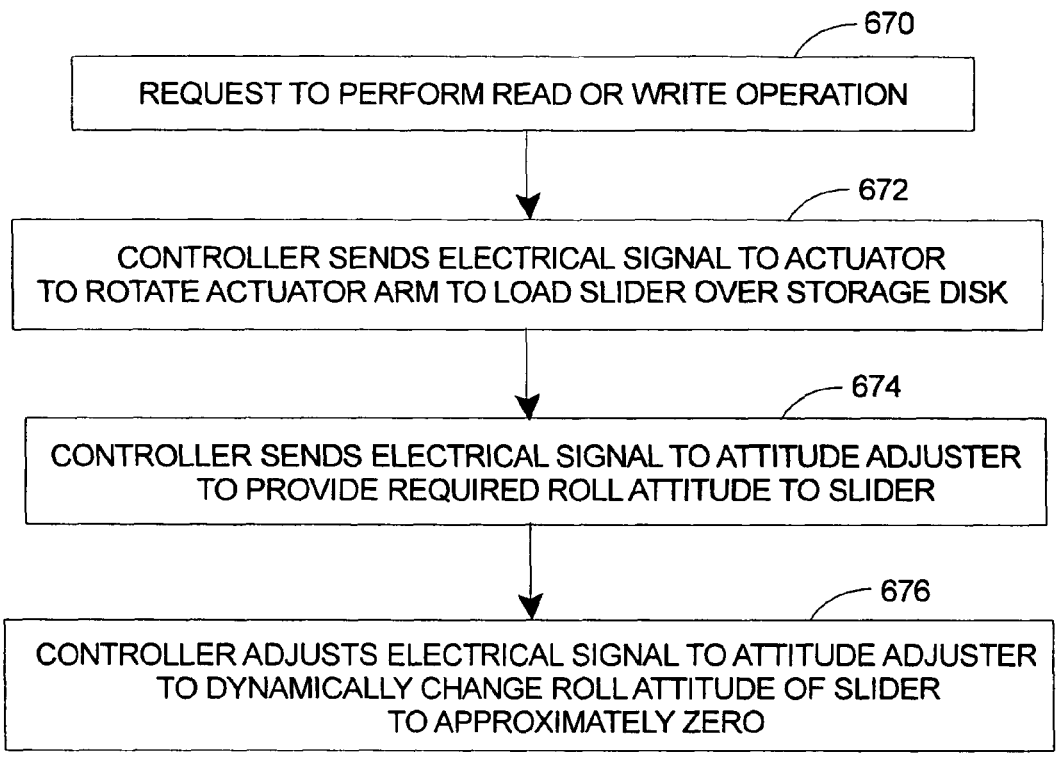
FIG. 6A is a flow chart describing one embodiment of operation of the disk drive during loading of the slider over the storage disk.

FIG. 6A is a flow chart that includes various steps of one embodiment of the disk drive during a drive operation that includes loading of the slider over the storage disk. At step 670, a specific operation is requested that requires movement of the slider from a parked position to directly over the storage disk. This type of operation can include a read or write operation, for example.

At step 672, the controller sends an electrical signal to the actuator motor to move the actuator arm and the head suspension assembly from the parked position toward the storage disk.

At step 674, the controller sends an electrical signal to the attitude adjuster to provide a specific roll static attitude to the slider relative to the storage disk. In one such embodiment, the attitude adjuster dynamically imparts a force on the flexure to provide a positive roll static attitude to the slider when the slider is moving to the storage disk from near the outer diameter. Alternatively, the attitude adjuster dynamically imparts a force on the flexure to provide a negative roll static attitude to the slider when the slider is moving to the storage disk from near the inner diameter. It is recognized that steps 672 and 674 can be initiated substantially simultaneously, or they can be initiated at separate times. For example, in one embodiment, step 674 is initiated after the actuator arm has begun to rotate, e.g., once the slider has reached a predetermined skew angle relative to the storage disk.

At step 676, the controller adjusts the electrical signal to the attitude adjuster to dynamically change the force on the flexure and thus the roll attitude of the slider. In one embodiment, once the slider has reached a predetermined skew angle (as determined by the line of demarcation between the non-data region and the data region, for example) the controller adjusts the electrical signal to provide a zero roll attitude or any other suitable roll attitude of the slider relative to the storage disk.

It is recognized that although the foregoing example only describes changes in the roll attitude, a somewhat similar procedure can be used to dynamically adjust the electrical signal to the attitude adjuster for changing the pitch attitude of the slider during loading of the slider over the storage disk.

Figure 6B:
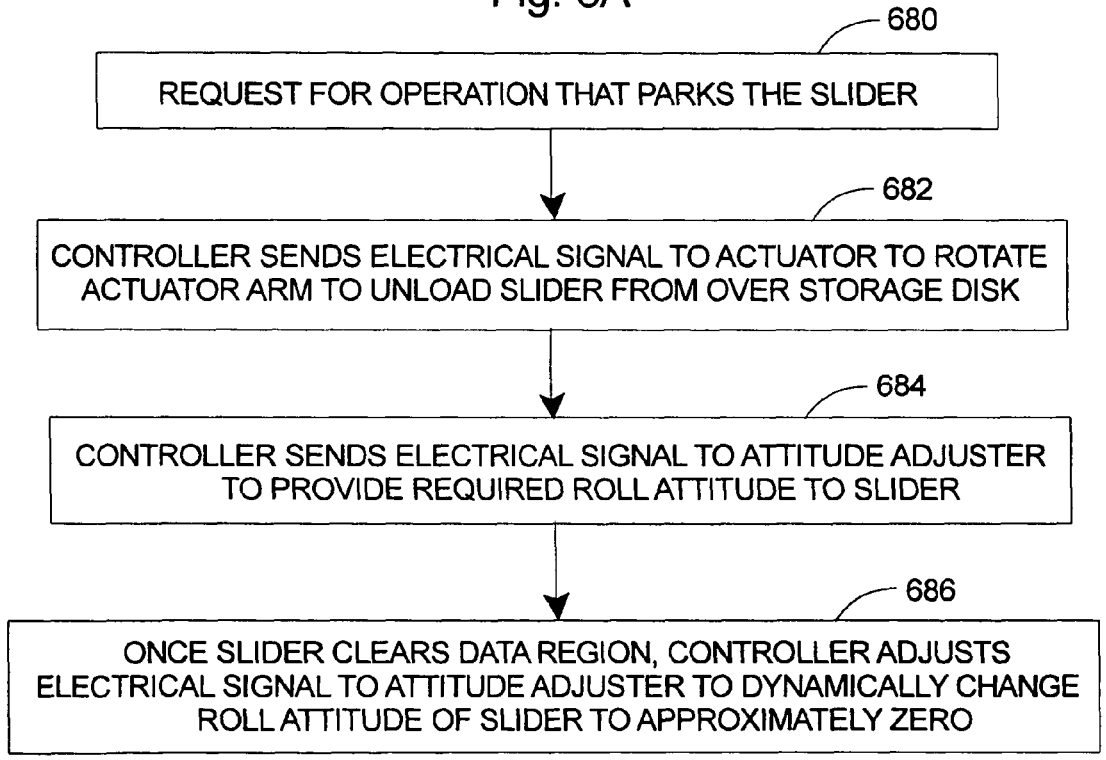
FIG. 6B is a flow chart describing one embodiment of operation of the disk drive during unloading of the slider from over the storage disk.

FIG. 6B is a flow chart that includes various steps of one embodiment of the disk drive during a drive operation that includes unloading of the slider from over the storage disk to a parked position, e.g., on a ramp. At step 680, a specific operation is requested that requires movement of the slider from directly over the storage disk to a parked position, e.g., a power-down request.

At step 682, the controller sends an electrical signal to the actuator motor to move the actuator arm and the head suspension assembly from over the storage disk to the parked position either near the inner or outer diameter of the storage disk.

At step 684, once the slider has moved to or near the line of demarcation between the data region and the non-data region, the controller sends an electrical signal to the attitude adjuster to provide a specific roll static attitude to the slider relative to the storage disk. In one such embodiment, the attitude adjuster dynamically imparts a force on the flexure to provide a positive roll static attitude to the slider when the slider is moving towards the outer diameter. Alternatively, the attitude adjuster dynamically imparts a force on the flexure to provide a negative roll static attitude to the slider when the slider towards the inner diameter. It is recognized that steps 682 and 684 can be initiated substantially simultaneously, or they can be initiated at separate times. For example, in one embodiment, step 684 is initiated after the actuator arm has begun to rotate, e.g., once the slider has reached a predetermined skew angle relative to the storage disk.

At step 686, once the slider has cleared the outer or inner diameter of the storage disk, or has begun to move onto a ramp for parking, the controller adjusts the electrical signal to the attitude adjuster to dynamically change the force on the flexure and thus the roll attitude of the slider. In one embodiment, once the slider has reached a predetermined skew angle, the controller adjusts the electrical signal to provide a zero roll attitude or any other suitable roll attitude of the slider relative to the storage disk.

FIGS. 7A-7C illustrate another embodiment of the disk drive 10 (illustrated in FIG. 1) including a slider 724 having a roll and/or pitch static attitude that does not dynamically adjust during loading and/or unloading from over the storage disk 716. Instead, in this embodiment, the roll static attitude and/or the pitch static attitude of the slider 724 is substantially constant.

FIG. 7A represents the slider 724 in a first position that is parked on a ramp 40 (illustrated in FIG. 1) near the outer diameter 742 or is otherwise not yet loaded over the storage disk 716. In this embodiment, in the first position, the slider 724 is secured to the flexure 36 (illustrated in FIG. 1, for example) to have a positive roll static attitude at all times.

FIG. 7B illustrates the slider 724 in a second position, moving toward the data region 762 of the storage disk 716 during loading. In the second position, the slider 724 is partially positioned directly over the storage disk 716, and is moving in a direction from the non-data region 760 toward the data region 762. The slider 724 is maintained in an orientation so that the slider 724 has a positive roll attitude relative to the storage disk 716.

FIG. 7C illustrates the slider 724 in a third position during or immediately following loading. In this embodiment, the slider 724 is maintained in an orientation so that the slider 724 has a positive roll attitude relative to the storage disk 716 even after the slider is fully loaded onto the storage disk 716. In other words, there is no active mechanism for adjusting the roll or pitch of the slider 724 during loading or unloading.

FIG. 8A represents the slider 824 in a first position that is parked on a ramp 40 (illustrated in FIG. 1) near the inner diameter 844 or is otherwise not yet loaded over the storage disk 816. In this embodiment, in the first position, the slider 824 is secured to the flexure 36 (illustrated in FIG. 1, for example) to have a negative roll static attitude at all times.

FIG. 8B illustrates the slider 824 in a second position, moving toward the data region 862 of the storage disk 816 during loading. In the second position, the slider 824 is partially positioned directly over the storage disk 816, and is moving in a direction from the non-data region 860 toward the data region 862. The slider 824 is maintained in an orientation so that the slider 824 has a negative roll attitude relative to the storage disk 816.

FIG. 8C illustrates the slider 824 in a third position during or immediately following loading. In this embodiment, the slider 824 is maintained in an orientation so that the slider 824 has a negative roll attitude relative to the storage disk 816 even after the slider 824 is fully loaded onto the storage disk 816. In other words, there is no active mechanism for adjusting the roll or pitch of the slider 824 during loading or unloading.

With one or more of the designs provided herein, because the slider is being loaded and unloaded so that the nearest point on the slider relative to the storage disk is also the point closest to the extreme edge of the storage disk, i.e. the inner or outer diameter, the width of the non-data region can be decreased and the width of the data region can be increased. In addition, or in the alternative, with one or more of the designs provided herein, the slider is less likely to contact the storage disk in the data region, thereby decreasing the likelihood of lost data or damage to a data-sensitive area of the storage disk.

While the particular disk drive 10 as herein shown and disclosed in detail, is fully capable of obtaining the objects and providing the advantages herein before stated, it is to be understood that it is merely illustrative of various embodiments of the invention. No limitations are intended to the details of construction or design herein shown other than as described in the appended claims.

What is claimed is:

1. A disk drive comprising:
   a drive housing;
   a storage disk that is rotatably coupled to the drive housing, the storage disk having a disk surface including a data region that stores data;
   a head suspension assembly including a slider and an attitude adjuster, the slider having an inner side edge, an outer side edge and a data transducer, the data transducer magnetically interacting with the storage disk, the attitude adjuster adjusting an attitude of the slider relative to the disk surface;
   an actuator assembly that moves the slider between a first position wherein the data transducer is not positioned directly over the data region and a second position wherein the data transducer is positioned directly over the data region during one of a load operation and an unload operation; and
   a controller that controls an electrical signal to the attitude adjuster during one of the load operation and the unload operation to dynamically adjust the attitude of the slider, wherein during the load or unload operation the head suspension assembly moves between a ramp located off the storage disk and a position over the data region of the storage disk.

2. The disk drive of claim 1 wherein the attitude adjuster adjusts a roll attitude of the slider.

3. The disk drive of claim 2 wherein the attitude adjuster selectively positions the slider to have a positive roll attitude during movement of the slider between the first position and the second position near an outer diameter of the storage disk.

4. The disk drive of claim 3 wherein the controller adjusts the electrical signal to the attitude adjuster after the slider has moved from the first position to the second position.

5. The disk drive of claim 4 wherein the attitude adjuster causes the roll attitude of the slider to become less positive after the slider has moved from the first position to the second position.

6. The disk drive of claim 3 wherein the controller adjusts the electrical signal to the attitude adjuster after the slider has moved from the second position to the first position.

7. The disk drive of claim 6 wherein the attitude adjuster causes the roll attitude of the slider to become less positive after the slider has moved from the second position to the first position.

8. The disk drive of claim 2 wherein the attitude adjuster selectively positions the slider to have a negative roll attitude during movement of the slider between the first position and the second position near an inner diameter of the storage disk.

9. The disk drive of claim 8 wherein the controller adjusts the electrical signal to the attitude adjuster after the slider has moved from the first position to the second position.

10. The disk drive of claim 9 wherein the attitude adjuster causes the roll attitude of the slider to become less negative after the slider has moved from the first position to the second position.

11. The disk drive of claim 8 wherein the controller adjusts the electrical signal to the attitude adjuster after the slider has moved from the second position to the first position.

12. The disk drive of claim 11 wherein the attitude adjuster causes the roll attitude of the slider to become less negative after the slider has moved from the second position to the first position.

13. The disk drive of claim 1 wherein the attitude adjuster includes a piezoelectric element.

14. The disk drive of claim 13 wherein the attitude adjuster includes a plurality of piezoelectric elements that cooperate to adjust the attitude of the slider.

15. The disk drive of claim 1 wherein the head suspension assembly includes a flexure, and wherein the attitude adjuster is secured to the flexure.

16. The disk drive of claim 1 wherein the head suspension assembly includes a load beam, and wherein the attitude adjuster is secured to the load beam.

17. The disk drive of claim 1 wherein the attitude adjuster adjusts a pitch attitude of the slider.

18. A disk drive comprising:
   a drive housing;
   a storage disk that is rotatably coupled to the drive housing, the storage disk having a disk surface including a data region that stores data;
   a slider having an inner side edge, an outer side edge and a data transducer, the data transducer magnetically interacting with the storage disk;
   a piezoelectric element that is coupled to the slider;
   an actuator assembly that moves the slider between a first position wherein the data transducer is not positioned directly over the data region and a second position wherein the data transducer is positioned directly over the data region during one of a load operation and an unload operation; and
   a controller that dynamically controls an electrical signal that is sent to the piezoelectric element during one of the load operation and the unload operation to change the dimensions of the piezoelectric element to dynamically adjust an attitude of the slider relative to the disk surface, wherein during the load or unload operation the slider moves between a ramp located off the storage disk and a position over the data region of the storage disk.

19. The disk drive of claim 18 wherein the piezoelectric element adjusts a roll attitude of the slider.

20. The disk drive of claim 19 wherein the piezoelectric element selectively positions the slider to have a positive roll attitude during movement of the slider between the first position and the second position near an outer diameter of the storage disk.

21. The disk drive of claim 20 wherein the controller adjusts the electrical signal to the piezoelectric element after the slider has moved from the first position to the second position.

22. The disk drive of claim 21 wherein the piezoelectric element causes the roll attitude of the slider to become less positive after the slider has moved from the first position to the second position.

23. The disk drive of claim 20 wherein the controller adjusts the electrical signal to the piezoelectric element after the slider has moved from the second position to the first position.

24. The disk drive of claim 23 wherein the piezoelectric element causes the roll attitude of the slider to become less positive after the slider has moved from the second position to the first position.

25. The disk drive of claim 20 wherein the piezoelectric element selectively positions the slider to have a negative roll attitude during movement of the slider between the first position and the second position near an inner diameter of the storage disk.

26. The disk drive of claim 25 wherein the controller adjusts the electrical signal to the piezoelectric element after the slider has moved from the first position to the second position.

27. The disk drive of claim 26 wherein the piezoelectric element causes the roll attitude of the slider to become less negative after the slider has moved from the first position to the second position.

28. The disk drive of claim 25 wherein the controller adjusts the electrical signal to the piezoelectric element after the slider has moved from the second position to the first position.

29. The disk drive of claim 28 wherein the piezoelectric element causes the roll attitude of the slider to become less negative after the slider has moved from the second position to the first position.

30. The disk drive of claim 18 further comprising a head suspension assembly including a flexure, and wherein the piezoelectric element is secured to the flexure.

31. The disk drive of claim 18 further comprising a head suspension assembly including a load beam, and wherein the piezoelectric element is secured to the load beam.

32. The disk drive of claim 18 wherein the piezoelectric element adjusts a pitch attitude of the slider.

33. A method for moving a slider relative to a storage disk of a disk drive, the method comprising the step of:
dynamically controlling a roll attitude of the slider with an electrically energized attitude adjuster as a position of the slider changes between a first position wherein a data transducer of the slider is parked on a ramp located off the storage disk and not directly over a data region of the storage disk and a second position wherein the data transducer is directly over the data region of the storage disk.

34. The method of claim 33 wherein the attitude adjuster includes a piezoelectric element.

35. The method of claim 34 wherein the controlling step includes changing the dimensions of the piezoelectric element by adjusting an electrical signal that is sent to the piezoelectric element with a controller.

36. The method of claim 33 wherein the controlling step includes providing a positive roll attitude of the slider while the position of the slider changes from the first position to the second position, and wherein the first position is near an outer diameter of the storage disk.

37. The method of claim 36 wherein the controlling step includes providing approximately zero roll attitude once the data transducer is positioned directly over the data region of the storage disk.

38. The method of claim 33 wherein the controlling step includes providing a negative roll attitude of the slider as the position of the slider changes from the first position to the second position, and wherein the first position is near an inner diameter of the storage disk.

39. The method of claim 38 wherein the controlling step includes providing approximately zero roll attitude once the data transducer is positioned directly over the data region of the storage disk.

40. The method of claim 33 wherein the controlling step includes providing a positive roll attitude of the slider while the position of the slider changes from the second position to the first position, and wherein the first position is near an outer diameter of the storage disk.

41. The method of claim 33 wherein the controlling step includes providing a negative roll attitude of the slider while the position of the slider changes from the second position to the first position, and wherein the first position is near an inner diameter of the storage disk.

* * * * *